(12) United States Patent  
Akkarakaran et al.

(10) Patent No.: US 10,952,154 B2  
(45) Date of Patent: Mar. 16, 2021

(54) MANAGING UNWANTED TRANSMISSIONS

(71) Applicant: QUALCOMM Incorporated, San Diego, CA (US)

(72) Inventors: Sony Akkarakaran, Poway, CA (US); Tao Luo, San Diego, CA (US); Peter Gaal, San Diego, CA (US); Timo Ville Vintola, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/593,054

(22) Filed: Oct. 4, 2019

(65) Prior Publication Data

US 2020/0037265 A1    Jan. 30, 2020

Related U.S. Application Data

(63) Continuation of application No. 15/913,513, filed on Mar. 6, 2018, now Pat. No. 10,455,517.

(Continued)

(51) Int. Cl.
| | |
|---|---|
| *H04W 52/24* | (2009.01) |
| *H04W 72/12* | (2009.01) |
| *H04W 52/28* | (2009.01) |
| *H04W 52/14* | (2009.01) |
| *H04L 5/00* | (2006.01) |
| *H04B 17/345* | (2015.01) |

(Continued)

(52) U.S. Cl.
CPC ......... *H04W 52/243* (2013.01); *H04L 5/0066* (2013.01); *H04L 5/0094* (2013.01); *H04W 52/146* (2013.01); *H04W 52/281* (2013.01); *H04W 72/1242* (2013.01); *H04B 7/0617* (2013.01); *H04B 17/11* (2015.01); *H04B 17/14* (2015.01); *H04B 17/345* (2015.01); *H04L 5/0023* (2013.01); *H04L 5/0048* (2013.01); *H04L 5/1469* (2013.01); *H04W 52/247* (2013.01); *H04W 52/367* (2013.01)

(58) Field of Classification Search
USPC .......................................... 375/267; 370/336
See application file for complete search history.

(56) References Cited

U.S. PATENT DOCUMENTS

| | | |
|---|---|---|
| 8,542,640 B2 | 9/2013 | Ramprashad et al. |
| 2009/0307554 A1* | 12/2009 | Marinier ............... H04L 1/1845 |
| | | 714/748 |

(Continued)

FOREIGN PATENT DOCUMENTS

| | | |
|---|---|---|
| EP | 2823660 B1 | 5/2017 |
| WO | WO-2017142469 A1 | 8/2017 |

*Primary Examiner* — Eva Y Puente  
(74) *Attorney, Agent, or Firm* — Linda G. Gunderson; Patterson & Sheridan LLP

(57) ABSTRACT

Aspects of the present disclosure provide techniques for managing unwanted transmissions by a wireless communications device, such as spurious transient transmissions caused by changing a power level of a transmitter. An exemplary method includes determining, based on one or more parameters, an action to reduce an impact of a spurious transmission by the UE, wherein the spurious transmission relates to at least one of changing a transmit power level at the UE or switching one or more radio components at the UE, and taking the determined action to reduce the impact.

30 Claims, 10 Drawing Sheets

Related U.S. Application Data

(60) Provisional application No. 62/468,923, filed on Mar. 8, 2017.

(51) Int. Cl.
*H04B 7/06* (2006.01)
*H04B 17/14* (2015.01)
*H04B 17/11* (2015.01)
*H04L 5/14* (2006.01)
*H04W 52/36* (2009.01)

(56) References Cited

U.S. PATENT DOCUMENTS

| | | |
|---|---|---|
| 2013/0235743 A1 | 9/2013 | Goldhamer |
| 2014/0161108 A1* | 6/2014 | Lohr ............... H04W 52/50 370/336 |
| 2016/0105902 A1 | 4/2016 | Hirsch et al. |
| 2016/0270006 A1* | 9/2016 | Choi ............... H04W 52/365 |
| 2016/0353484 A1 | 12/2016 | Wentink |
| 2016/0359376 A1 | 12/2016 | Zeine et al. |
| 2017/0366226 A1 | 12/2017 | Weissman et al. |
| 2017/0367062 A1 | 12/2017 | Patel et al. |
| 2018/0262995 A1 | 9/2018 | Akkarakaran et al. |
| 2020/0014493 A1* | 1/2020 | Shao ............... H04L 1/0003 |
| 2020/0045767 A1* | 2/2020 | Velev ............... H04W 76/27 |

* cited by examiner

900

920

950

1100

1102

PROVIDE AN INDICATION OF ONE OR MORE PARAMETERS RELATED TO REDUCING AN IMPACT OF A SPURIOUS TRANSMISSION BY A USER EQUIPMENT (UE) TO THE UE, WHEREIN THE SPURIOUS TRANSMISSION RELATES TO AT LEAST ONE OF CHANGING A TRANSMIT POWER LEVEL AT THE UE OR SWITCHING ONE OR MORE RADIO COMPONENTS AT THE UE

FIG. 11

MANAGING UNWANTED TRANSMISSIONS

CROSS-REFERENCE TO RELATED APPLICATIONS

The present Application for Patent is a continuation of and claims priority to U.S. patent application Ser. No. 15/913,513, filed Mar. 6, 2018, which claims priority to U.S. Provisional Patent Application No. 62/468,923, filed Mar. 8, 2017, which are both assigned to the assignee hereof and hereby expressly incorporated by reference herein in their entireties.

INTRODUCTION

Aspects of the present disclosure relate to wireless communications and, more particularly, to managing unwanted transmissions by a wireless communications device, such as spurious transient transmissions caused by changing a power level of a transmitter.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

A wireless communication network may include a number of Node Bs that can support communication for a number of user equipments (UEs). A UE may communicate with a Node B via the downlink and uplink. The downlink (or forward link) refers to the communication link from the Node B to the UE, and the uplink (or reverse link) refers to the communication link from the UE to the Node B.

Any transition in a wireless modem (e.g., a wireless modem in a UE) between 'transmitting' and 'not transmitting' may cause some switching transient. Some transmission may occur in the transient, but the transmitted waveform in the transient may not be the desired waveform. Instead, the waveform may gradually transition into the desired waveform. This transient may be caused by ramp up time for various circuits (e.g., of the modem) to attain desired power levels. Such transients may also occur with a change in transmit power level of the modem. Thus transitioning to 'transmitting' from 'not-transmitting' is a special case, where one of the power levels is zero. Amplitude and duration of the transient transmission may depend on the amount of change of the power level.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Techniques for managing unwanted transmissions by a wireless communications device, such as spurious transient transmissions caused by changing a power level of a transmitter, are described herein.

In an aspect, a method for wireless communication is provided. The method may be performed, for example, by a user equipment (UE). The method generally includes determining, based on one or more parameters, an action to reduce an impact of a spurious transmission by the UE, wherein the spurious transmission relates to at least one of changing a transmit power level at the UE or switching one or more radio components at the UE, and taking the determined action to reduce the impact.

In an aspect, a method for wireless communication is provided. The method may be performed, for example, by BS. The method generally includes providing an indication of one or more parameters related to reducing an impact of a spurious transmission by a user equipment (UE) to the UE, wherein the spurious transmission relates to at least one of changing a transmit power level at the UE or switching one or more radio components at the UE.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 11 illustrates example operations that may be performed by a BS, according to aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
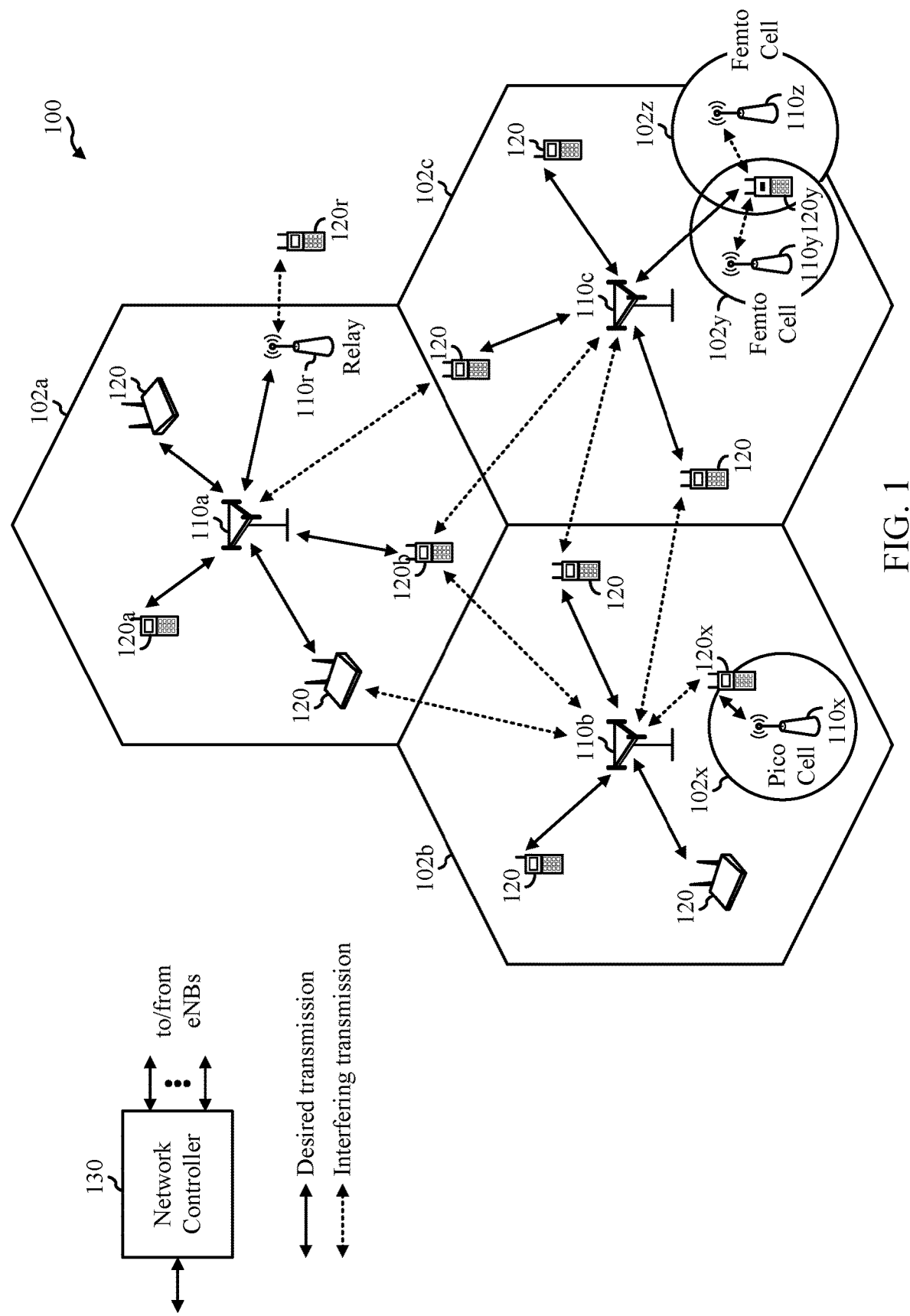
FIG. 1 is a block diagram conceptually illustrating an example telecommunications system, according to aspects of the present disclosure.

Aspects of the present disclosure provide apparatus, methods, processing systems, and computer readable mediums for managing unwanted transmissions by a wireless communications device, such as spurious transient transmissions caused by changing a power level of a transmitter.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting and the scope of the disclosure is being defined by the appended claims and equivalents thereof.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

For clarity, while aspects may be described herein using terminology commonly associated with 3G and/or 4G wireless technologies, aspects of the present disclosure can be applied in other generation-based communication systems, such as 5G and later, including NR technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may include Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and mission critical targeting ultra reliable low latency communications (URLLC). For these general topics, different techniques are considered, such as coding, low-density parity check (LDPC), and polar. NR cell may refer to a cell operating according to the new air interface or fixed transport layer. A NR Node B (e.g., 5G Node B) may correspond to one or multiple transmission reception points (TRPs).

NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. TRPs may transmit downlink signals to UEs indicating the cell type. Based on the cell type indication, the UE may communicate with the TRP. For example, the UE may determine TRPs to consider for cell selection, access, handover, and/or measurement based on the indicated cell type.

In some cases, the UE can receive measurement configuration from the RAN. The measurement configuration information may indicate ACells or DCells for the UE to measure. The UE may monitor/detect measurement reference signals from the cells based on measurement configuration information. In some cases, the UE may blindly detect MRS. In some cases the UE may detect MRS based on MRS-IDs indicated from the RAN. The UE may report the measurement results.

Example Wireless Communications System

FIG. 1 illustrates an example wireless network 100 in which aspects of the present disclosure may be performed. For example, the wireless network may be a new radio (NR) or a 5G network.

According to aspects, the wireless network 100 may be a heterogeneous numerology system, wherein UEs 120 within the network 100 may be asynchronous, have different inter-carrier spacing, and/or have different cyclic prefix lengths. According to aspects a BS, such as BS 110a may support different services having different service requirements. For example, the BS 110a may support subframe with different subcarrier spacing. The BS 110a may communicate with UE 120a using a first subcarrier spacing and may communicate with UE 120b using a second subcarrier spacing. UEs 120a, 120b may be configured to operate according to one or more numerologies. In the manner a network may support subframes with different subcarrier spacings.

According to aspects, the subcarrier spacing associated with the different service requirements may be scaled. As a non-limiting example, for illustrative purposes only, the subcarrier spacing may be 15 kHz, 30 kHz, 60 kHz, 120 kHz, and so on (e.g., x1, x2, x4, x8, and so on . . . ). According to another example, the subcarrier spacing may be 17.5 kHz, 35 kHz, and so on (e.g., x1, x2, x3, x4, and so on). Aspects described herein provide methods for tone allocation and resource block definition for heterogeneous numerology systems, which may be beneficial for scheduling devices and communicating with one or more devices in heterogeneous numerology systems.

As described herein, a numerology may be based, at least in part, on a subcarrier spacing and a shift in frequency. The BS 110a and UE 120a may communicate using tones determined using a numerology. Additionally or alternatively, the BS 110a and 120a may communicate using an RB defined using a numerology.

The BS 110 may be configured to perform the operations 1800 and 2000 and the UE 120 (e.g., UE 120a) may be configured to perform the operations 1900 and 2100. Furthermore, the BS 110a and the UE 120a may be configured to perform other aspects described herein. The BS may comprise and/or include a transmission reception point (TRP).

The system illustrated in FIG. 1 may be, for example, a long term evolution (LTE) network. The wireless network 100 may include a number of Node Bs (e.g., eNodeBs, eNBs, 5G Node B, etc.) 110 and other network entities. A Node B may be a station that communicates with the UEs and may also be referred to as a base station, an access point, or a 5G Node B.

Each Node B 110 may provide communication coverage for a particular geographic area. In 3GPP, the term "cell" can refer to a coverage area of a Node B and/or a Node B subsystem serving this coverage area, depending on the context in which the term is used.

A Node B may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A Node B for a macro cell may be referred to as a macro Node B. A Node B for a pico cell may be referred to as a pico Node B. A Node B for a femto cell may be referred to as a femto Node B or a home Node B. In the example shown in FIG. 1, the Node Bs 110a, 110b and 110c may be macro Node Bs for the macro cells 102a, 102b and 102c, respectively. The Node B 110x may be a pico Node B for a pico cell 102x. The Node Bs 110y and 110z may be femto Node Bs for the femto cells 102y and 102z, respectively. A Node B may support one or multiple (e.g., three) cells.

The wireless network 100 may also include relay stations. A relay station is a station that receives a transmission of data and/or other information from an upstream station (e.g., a Node B or a UE) and sends a transmission of the data and/or other information to a downstream station (e.g., a UE or a Node B). A relay station may also be a UE that relays transmissions for other UEs. In the example shown in FIG. 1, a relay station 110r may communicate with the Node B 110a and a UE 120r in order to facilitate communication between the Node B 110a and the UE 120r. A relay station may also be referred to as a relay Node B, a relay, etc.

The wireless network 100 may be a heterogeneous network that includes Node Bs of different types, e.g., macro Node Bs, pico Node Bs, femto Node Bs, relays, transmission reception points (TRPs), etc. These different types of Node Bs may have different transmit power levels, different coverage areas, and different impact on interference in the wireless network 100. For example, macro Node Bs may have a high transmit power level (e.g., 20 Watts) whereas pico Node Bs, femto Node Bs and relays may have a lower transmit power level (e.g., 1 Watt).

The wireless network 100 may support synchronous or asynchronous operation. For synchronous operation, the Node Bs may have similar frame timing, and transmissions from different Node Bs may be approximately aligned in time. For asynchronous operation, the Node Bs may have different frame timing, and transmissions from different Node Bs may not be aligned in time. The techniques described herein may be used for both synchronous and asynchronous operation.

A network controller 130 may couple to a set of Node Bs and provide coordination and control for these Node Bs. The network controller 130 may communicate with the Node Bs 110 via a backhaul. The Node Bs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a netbook, a smart book, etc. A UE may be able to communicate with macro Node Bs, pico Node Bs, femto Node Bs, relays, etc. In FIG. 1, a solid line with double arrows indicates desired transmissions between a UE and a serving Node B, which is a Node B designated to serve the UE on the downlink and/or uplink. A dashed line with double arrows indicates interfering transmissions between a UE and a Node B.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively. New radio (NR) may use a different air interface, other than OFDM-based. NR networks may include entities such central units or distributed units.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. A single component carrier bandwidth of 100 MHZ may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such central units or distributed units.

Figure 2:
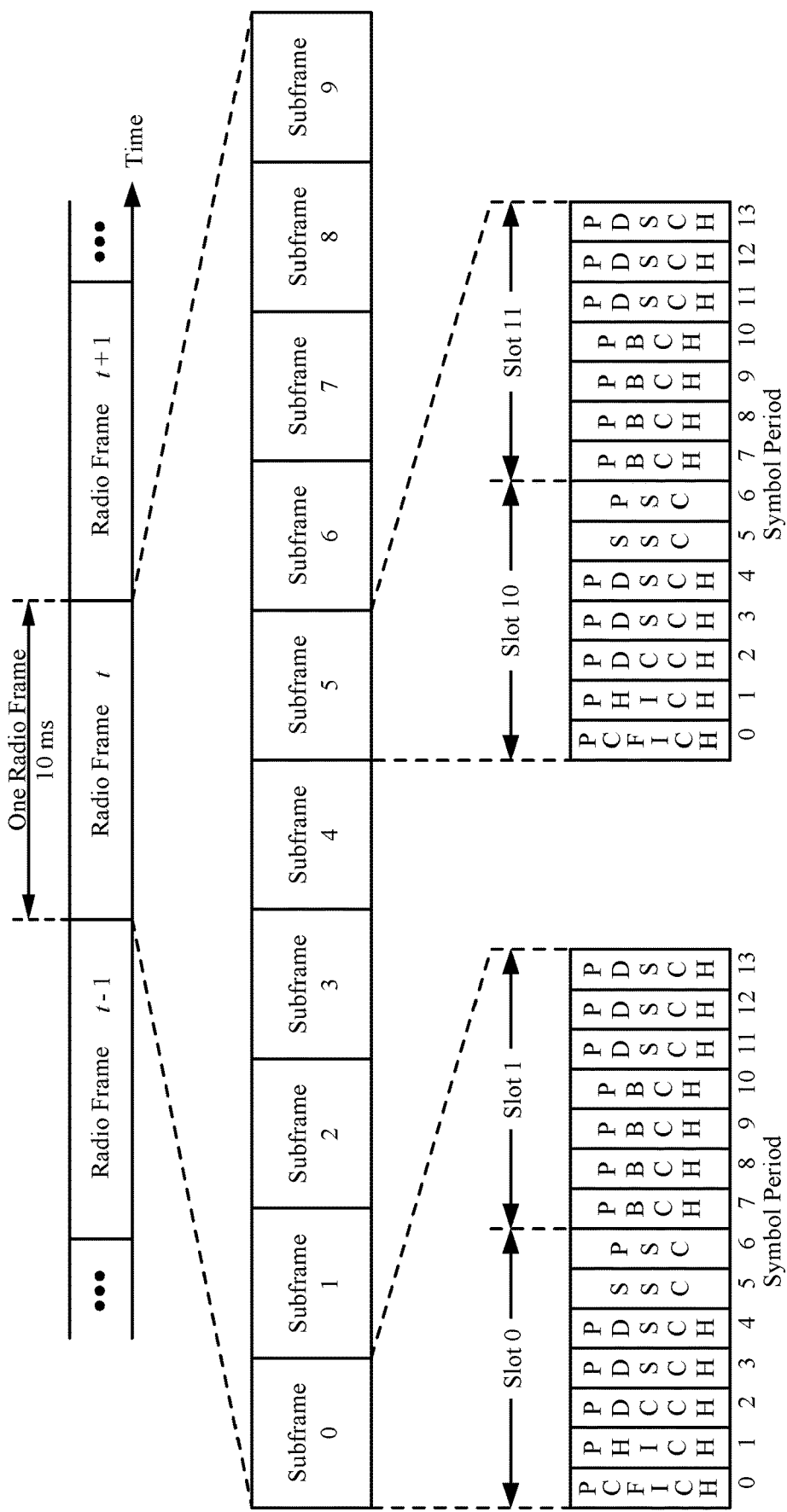
FIG. 2 is a block diagram conceptually illustrating an example downlink frame structure in a telecommunications system, according to aspects of the present disclosure.

FIG. 2 shows a down link (DL) frame structure used in a telecommunication systems (e.g., LTE). The transmission timeline for the downlink may be partitioned into units of radio frames. Each radio frame may have a predetermined duration (e.g., 10 milliseconds (ms)) and may be partitioned into 10 sub-frames with indices of 0 through 9. Each sub-frame may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each sub-frame may be assigned indices of 0 through 2L-1. The available time frequency resources may be partitioned into resource blocks. Each resource block may cover N subcarriers (e.g., 12 subcarriers) in one slot.

In LTE, a Node B may send a primary synchronization signal (PSS) and a secondary synchronization signal (SSS) for each cell in the Node B. The primary and secondary synchronization signals may be sent in symbol periods 6 and 5, respectively, in each of sub-frames 0 and 5 of each radio frame with the normal cyclic prefix, as shown in FIG. 2. The synchronization signals may be used by UEs for cell detection and acquisition. The Node B may send a Physical Broadcast Channel (PBCH) in symbol periods 0 to 3 in slot 1 of sub-frame 0. The PBCH may carry certain system information.

The Node B may send a Physical Control Format Indicator Channel (PCFICH) in only a portion of the first symbol period of each sub-frame, although depicted in the entire first symbol period in FIG. 2. The PCFICH may convey the number of symbol periods (M) used for control channels, where M may be equal to 1, 2 or 3 and may change from sub-frame to sub-frame. M may also be equal to 4 for a small system bandwidth, e.g., with less than 10 resource blocks. In the example shown in FIG. 2, M=3. The Node B may send a Physical HARQ Indicator Channel (PHICH) and a Physical Downlink Control Channel (PDCCH) in the first M symbol periods of each sub-frame (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The Node B may send a Physical Downlink Shared Channel (PDSCH) in the remaining symbol periods of each sub-frame. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The Node B may send the PSS, SSS and PBCH in the center 1.08 MHz of the system bandwidth used by the Node B. The Node B may send the PCFICH and PHICH across the entire system bandwidth in each symbol period in which these channels are sent. The Node B may send the PDCCH to groups of UEs in certain portions of the system bandwidth. The Node B may send the PDSCH to specific UEs in specific portions of the system bandwidth. The Node B may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one sub-carrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. A Node B may send the PDCCH to the UE in any of the combinations that the UE will search.

A UE may be within the coverage of multiple Node Bs. One of these Node Bs may be selected to serve the UE. The serving Node B may be selected based on various criteria such as received power, path loss, signal-to-noise ratio (SNR), etc.

Figure 3:
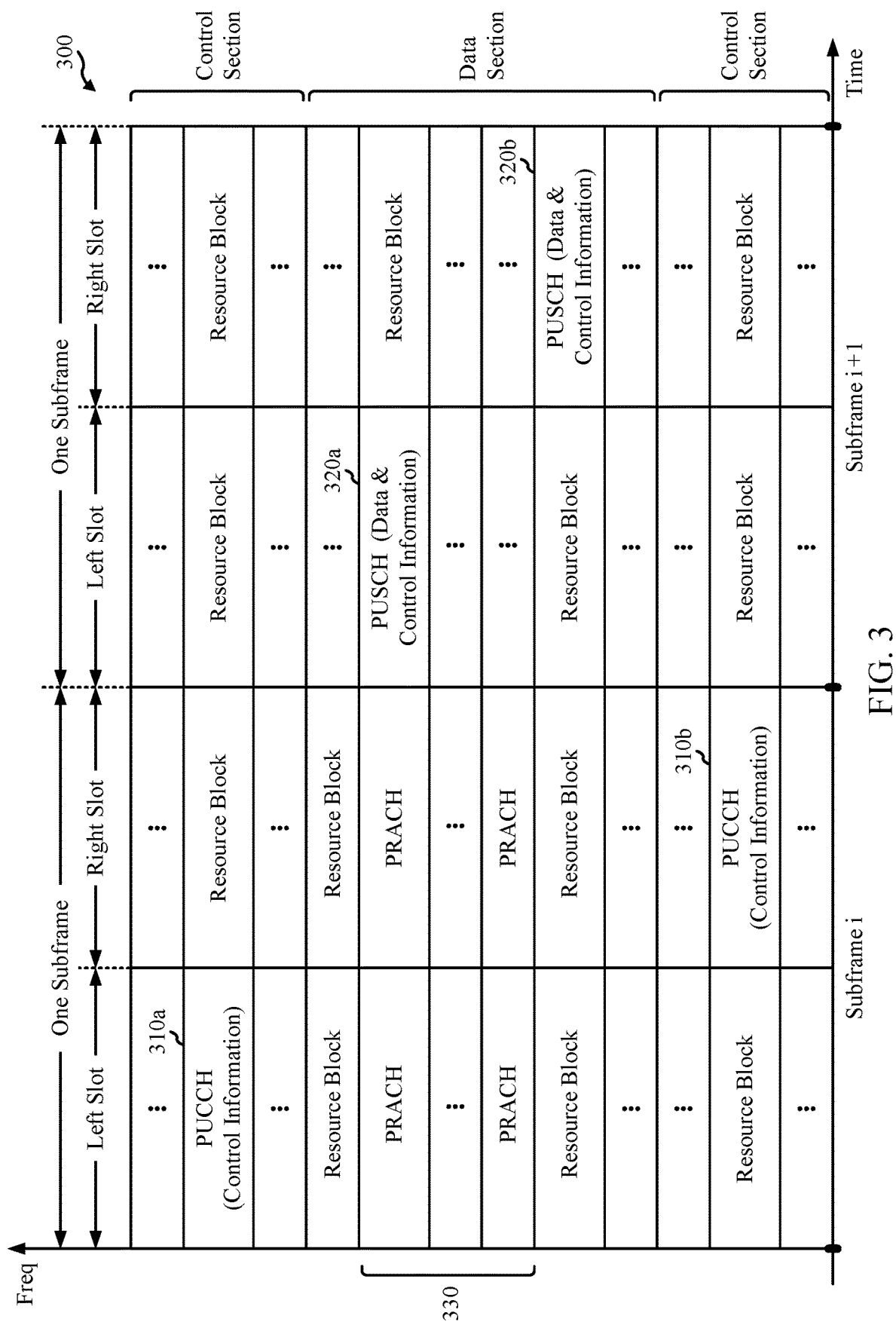
FIG. 3 is a diagram illustrating an example uplink frame structure in a telecommunications system, according to aspects of the present disclosure.

FIG. 3 is a diagram 300 illustrating an example of an uplink (UL) frame structure in a telecommunications system (e.g., LTE). The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 310a, 310b in the control section to transmit control information to a Node B. The UE may also be assigned resource blocks 320a, 320b in the data section to transmit data to the Node B. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 330. The PRACH 330 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 4:
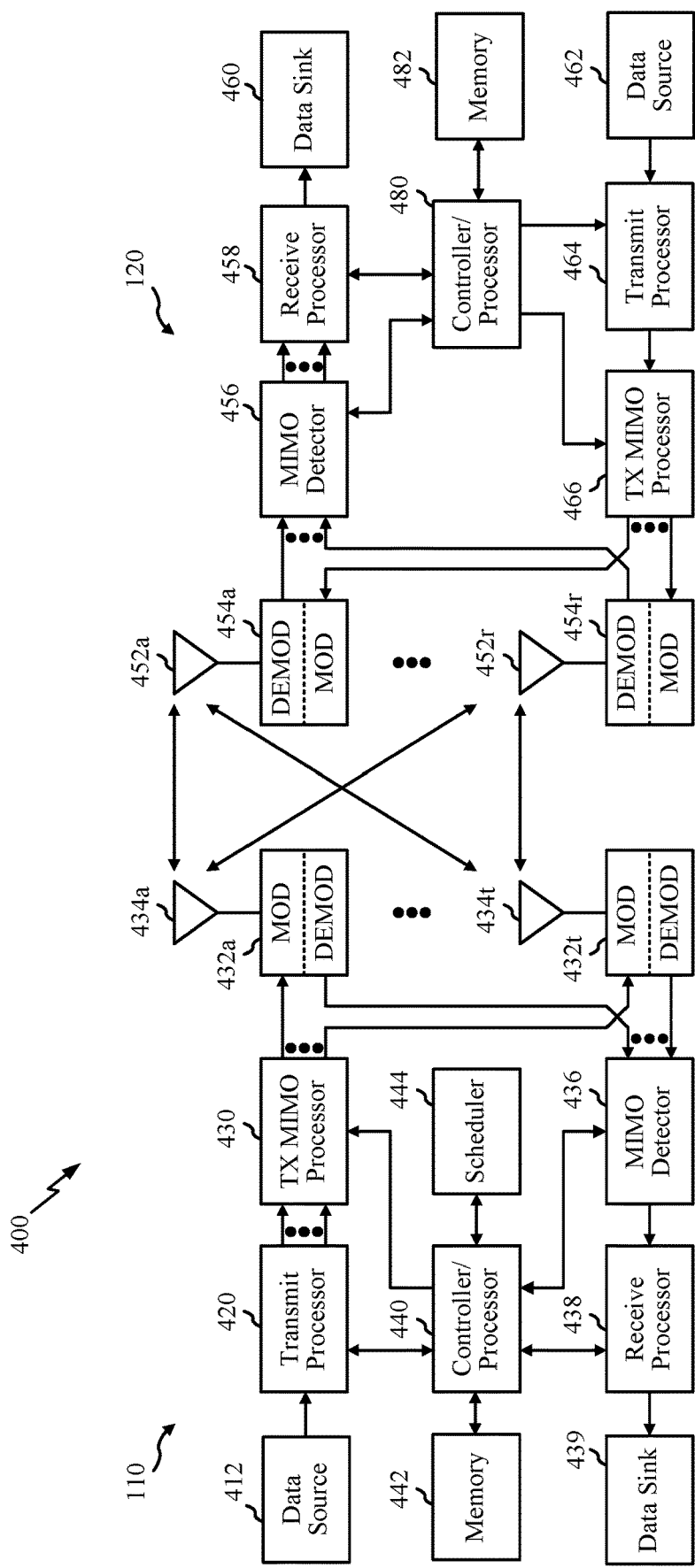
FIG. 4 is a block diagram conceptually illustrating a design of an example Node B and user equipment (UE), according to aspects of the present disclosure.

FIG. 4 illustrates example components of the base station 110 and UE 120 illustrated in FIG. 1, which may be used to implement aspects of the present disclosure. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 12-14. The BS 110 may comprise a TRP. As illustrated, the BS/TRP 110 and UE 120 may communicate using tone alignment and/or RB definition in a heterogeneous numerology system.

FIG. 4 shows a block diagram of a design of a base station/Node B/TRP 110 and a UE 120, which may be one of the base stations/Node Bs/TRPs and one of the UEs in FIG. 1. For a restricted association scenario, the base station 110 may be the macro Node B 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The transmit processor 420 may process (e.g., encode and symbol map) the data and control information to obtain data symbols and control symbols, respectively. The transmit processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively. The transmit processor 420, TX MIMO processor 430, modulators 432a-432t, and antennas 434a-434t may be collectively referred to as a transmit chain of the base station.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480. The receive processor 458, MIMO detector 456, demodulators 454a-454r, and antennas 452a-452t may be collectively referred to as a receive chain of the UE.

On the uplink, at the UE 120, a transmit processor 464 may receive and process data (e.g., for the PUSCH) from a data source 462 and control information (e.g., for the PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. The transmit processor 464, TX MIMO processor 466, modulators 454a-454r, and antennas 452a-452r may be collectively referred to as a transmit chain of the UE. At the base station 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440. The receive processor 438, MIMO detector 436, demodulators 432a-432t, and antennas 434a-434t may be collectively referred to as a receive chain of the base station.

The controllers/processors 440 and 480 may direct the operation at the base station 110 and the UE 120, respectively. The processor 440 and/or other processors and modules at the base station 110 may perform or direct, e.g., the execution of various processes for the techniques described herein. The processor 480 and/or other processors and modules at the UE 120 may also perform or direct, e.g., the execution of the functional blocks illustrated in FIGS. 18-21, and/or other processes for the techniques described herein. The memories 442 and 482 may store data and program codes for the base station 110 and the UE 120, respectively. A scheduler 444 may schedule UEs for data transmission on the downlink and/or uplink.

Figure 5:
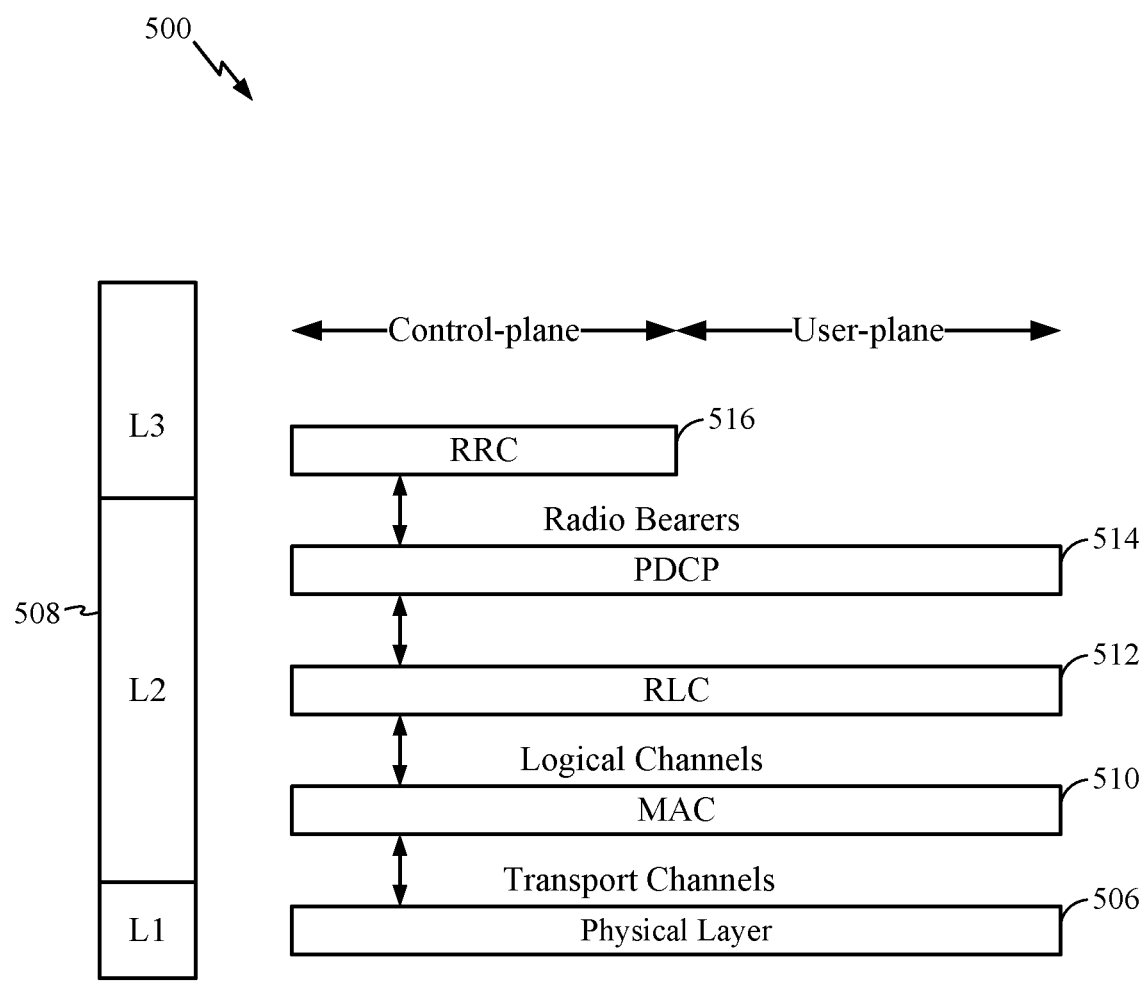
FIG. 5 is a diagram illustrating an example radio protocol architecture for the user and control planes, according to aspects of the present disclosure.

FIG. 5 is a diagram 500 illustrating an example of a radio protocol architecture for the user and control planes in LTE. The radio protocol architecture for the UE and the Node B is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and Node B over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the Node B on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between Node Bs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and Node B is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the Node B and the UE.

Figure 6:
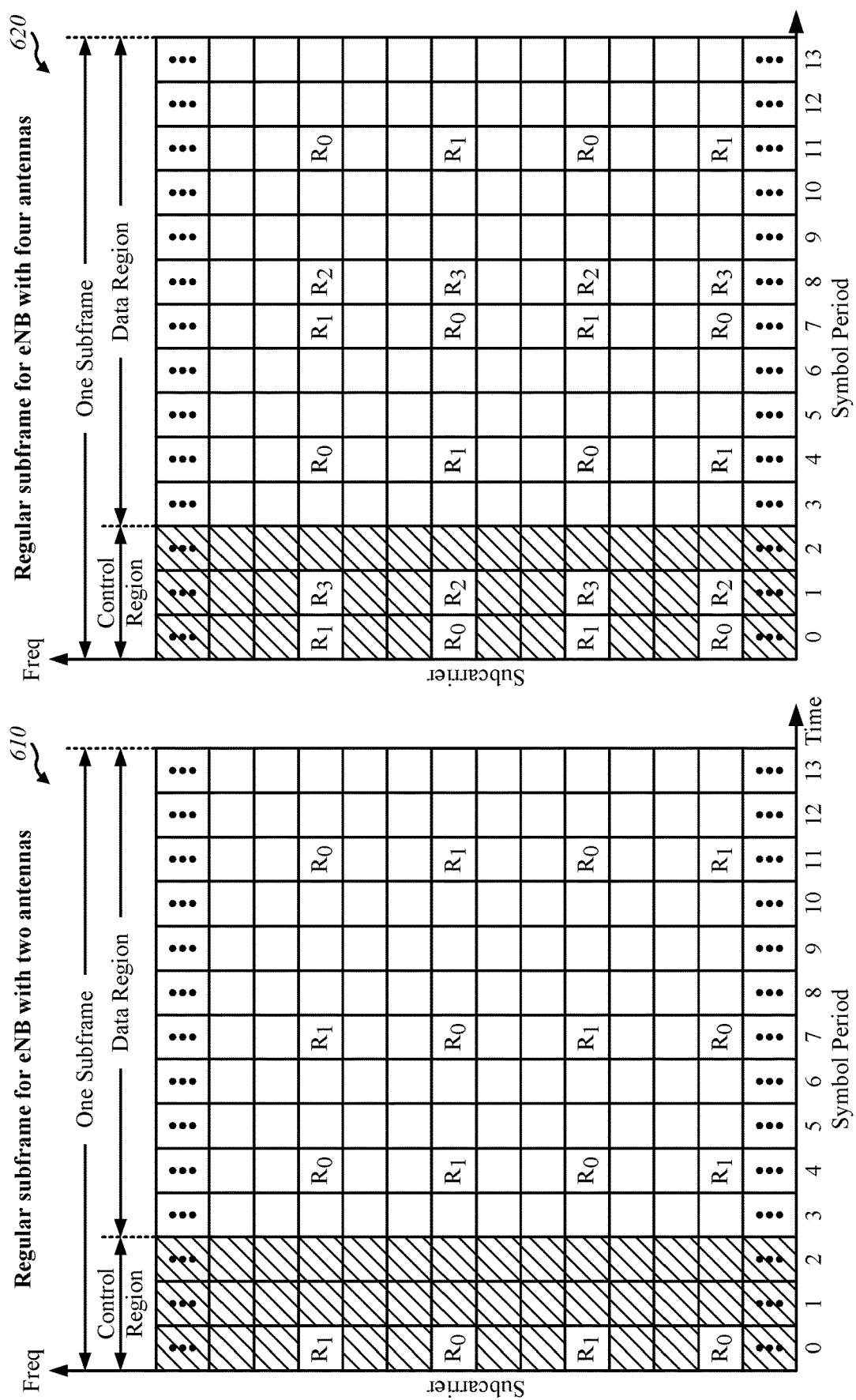
FIG. 6 illustrates an example subframe resource element mapping, according to aspects of the present disclosure.

FIG. 6 shows two exemplary subframe formats 610 and 620 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 610 may be used for a Node B equipped with two antennas. A CRS may be transmitted from antennas 0 and 1 in symbol periods 0, 4, 7 and 11. A reference signal is a signal that is known a priori by a transmitter and a receiver and may also be referred to as a pilot. A CRS is a reference signal that is specific for a cell, e.g., generated based on a cell identity (ID). In FIG. 6, for a given resource element with label $R_a$, a modulation symbol may be transmitted on that resource element from antenna a, and no modulation symbols may be transmitted on that resource element from other antennas. Subframe format 620 may be used for a Node B equipped with four antennas. A CRS may be transmitted from antennas 0 and 1 in symbol periods 0, 4, 7 and 11 and from antennas 2 and 3 in symbol periods 1 and 8. For both subframe formats 610 and 620, a CRS may be transmitted on evenly spaced subcarriers, which may be determined based on cell ID. Different Node Bs may transmit their CRSs on the same or different subcarriers, depending on their cell IDs. For both subframe formats 610 and 620, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q-1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission (HARQ) for data transmission on the downlink and uplink. For HARQ, a transmitter (e.g., a Node B) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage area of multiple Node Bs. One of these Node Bs may be selected to serve the UE. The serving Node B may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering Node Bs.

New radio (NR) may refer to radios configured to operate according a wireless standard, such as 5G (e.g. wireless network 100). NR may include Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and mission critical targeting ultra reliable low latency communications (URLLC).

NR cell may refer to a cell operating according in the NR network. A NR Node B (e.g., Node B 110) may correspond to one or multiple transmission reception points (TRPs). As used herein, a cell may refer to a combination of downlink (and potentially also uplink) resources. The linking between the carrier frequency of the downlink resources and the carrier frequency of the uplink resources is indicated in the system information (SI) transmitted on the downlink resources. For example, system information can be transmitted in a physical broadcast channel (PBCH) carrying a master information block (MIB).

NR RAN architecture may include a central unit (CU) (e.g., network controller 130). The CU may be an Access node controller (ANC). The CU terminates backhaul interface to RAN-CN, terminates backhaul interface to neighbor RAN node. The RAN may include a Distributed unit that may be one or more TRPs that may be connected to one or more ANCs (not shown). TRPs may advertise System Information (e.g., Global TRP ID), may include PDCP/RLC/MAC functions, may comprise one or more antenna ports, may be configured to individually (dynamic selection) or jointly (joint transmission), and may serve traffic to the UE.

Heterogeneous numerology wireless communication systems may refer to systems in which UEs may be asynchronous, have different intercarrier spacing and/or have different cyclic prefix lengths. According to aspects of the present disclosure, tones for different numerologies may be aligned. A numerology may be based on a subcarrier spacing and a tone shift. As described herein, regardless of the numerology, the tones from the heterogeneous numerology wireless systems may be frequency-aligned.

According to aspects of the present disclosure, in a beamforming system, a broadcast signal transmitted in a particular direction (e.g., from a BS) may only reach a subset of UEs or other devices. For dynamic TDD operation, a transmitter may transmit a slot or frame format indicator to indicator the slot or frame structure for the next N slots or subframes. However, multiple users (e.g., UEs, BSs) may be scheduled in the N slots or subframes, and the users may share the transmission resources (e.g., the available frequencies for the N slots or subframes) by using TDM or FDM. Those users may have different beamforming or beam pairing association(s) with a transmitter, such as an eNB or a gNB. The transmitter (e.g., a BS, an eNB, a gNB) may transmit a slot or frame format indicator in a few OFDM symbols at the beginning of the N slots or subframes. For non-beamforming systems, transmitting one such indicator (e.g., broadcast to all devices in range) may be sufficient.

Figure 7:
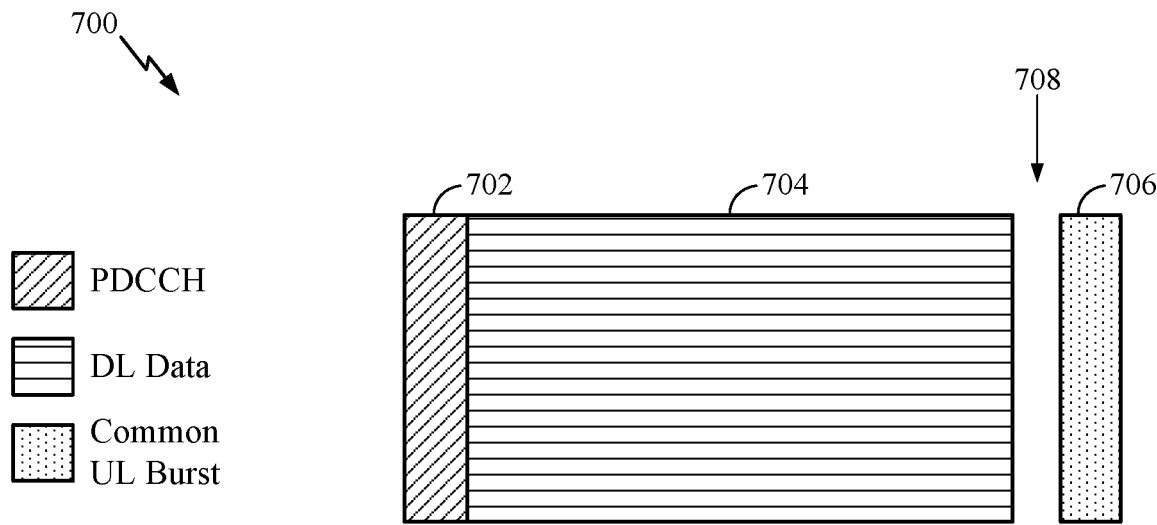
FIG. 7 illustrates an example of a DL-centric subframe, in accordance with certain aspects of the present disclosure.

FIG. 7 is a diagram 700 showing an example of a DL-centric subframe. The DL-centric subframe may include a control portion 702. The control portion 702 may exist in the initial or beginning portion of the DL-centric subframe. The control portion 702 may include various scheduling information and/or control information corresponding to various portions of the DL-centric subframe. In some configurations, the control portion 702 may be a physical DL control channel (PDCCH), as indicated in FIG. 7. The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PD SCH).

The DL-centric subframe may also include a common UL portion 706. The common UL portion 706 may sometimes be referred to as an UL burst, a common UL burst, and/or various other suitable terms. The common UL portion 706 may include feedback information corresponding to various other portions of the DL-centric subframe. For example, the common UL portion 706 may include feedback information corresponding to the control portion 702. Non-limiting examples of feedback information may include an ACK signal, a NACK signal, a HARQ indicator, and/or various other suitable types of information. The common UL portion 706 may include additional or alternative information, such as information pertaining to random access channel (RACH) procedures, scheduling requests (SRs), and various other suitable types of information. As illustrated in FIG. 7, the end of the DL data portion 704 may be separated in time from the beginning of the common UL portion 706 by a guard period 708. This guard period may sometimes be referred to as a gap, a guard interval, and/or various other suitable terms. This guard period provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 8:
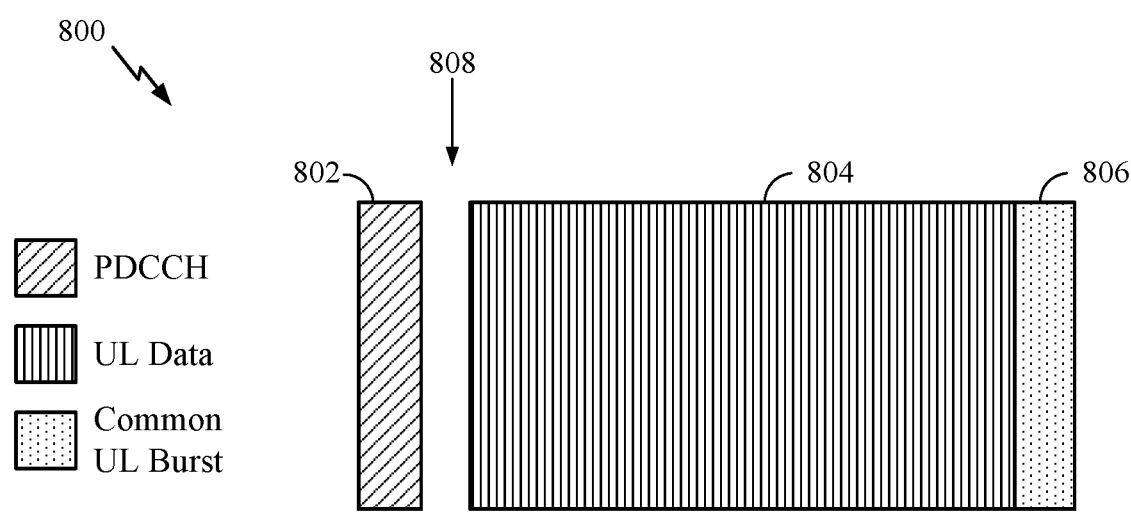
FIG. 8 illustrates an example of an UL-centric subframe, in accordance with certain aspects of the present disclosure.

FIG. 8 is a diagram 800 showing an example of an UL-centric subframe. The UL-centric subframe may include a control portion 802. The control portion 802 may exist in the initial or beginning portion of the UL-centric subframe. The control portion 802 in FIG. 8 may be similar to the control portion described above with reference to FIG. 7. The UL-centric subframe may also include an UL data portion 804. The UL data portion 804 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 802 may be a physical DL control channel (PDCCH).

As illustrated in FIG. 8, the end of the control portion 802 may be separated in time from the beginning of the UL data portion 804 by a guard period 808. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 806. The common UL portion 806 in FIG. 8 may be similar to the common UL portion 706 described above with reference to FIG. 7. The common UL portion 806 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Managing Unwanted Transmissions

Any transition in a wireless modem (e.g., a wireless modem in a UE) between 'transmitting' and 'not transmitting' may cause some switching transient. A transmission (e.g., a spurious transmission) may occur in the transient, but the transmitted waveform in the transient may not be the desired waveform. Instead, the waveform of the transmission in the transient may gradually transition into the desired waveform. This transmission may be caused by ramp up time for various circuits (e.g., of the modem) to attain desired power levels. Such transmissions may also occur with a change in transmit power level of the modem. Thus transitioning between 'transmitting' and 'not-transmitting' is a special case of changing a transmit power level of a modem, where one of the power levels is zero. Amplitude and duration of the transient or spurious transmission may depend on the amount of change of the power level.

As used herein, "scheduled transmitted signal" and "scheduled transmission" refer to a transmission via time and/or frequency resources that are reserved for that transmission. Thus, as used herein, "scheduled transmitted signal" and "scheduled transmission" refer to both transmissions made in response to scheduling grants (e.g., received by a UE from a BS either dynamically or semi-statically, for either control or data transmission) and grant-free transmissions made via reserved time and/or frequency resources (e.g., RACH transmissions by a UE).

According to aspects of the present disclosure, timing of a transient or spurious transmission may be controlled to reduce a potential impact of the transient or spurious transmission. For example, if a spurious transmission is located within a period of a desired or scheduled transmitted signal, then the spurious transmission may contribute some distortion to the desired or scheduled transmitted signal and may cause an increase in an error vector magnitude (EVM) of the desired or scheduled transmitted signal. In a second example, if a spurious transmission is located outside of a period of a desired or scheduled transmit signal, then the spurious transmission may occur during a guard period, if the communications system uses guard periods, and the spurious transmission may not cause any harm (e.g., by increasing EVM of the desired or scheduled signal or interfering with other signals). However, guard periods are not always available, due to the communications system not using guard periods, or a device being required to make consecutive transmissions at differing power levels. If the spurious transmission does not occur during a guard period, then the transient or spurious transmission occurs in a time period adjacent to the time period of the desired or scheduled transmission and may interfere with other 'legitimate' (e.g., desired or scheduled) transmissions and/or receptions by the same or by other modems (e.g., in the same device or other devices) in the wireless communications system that are scheduled to transmit and/or receive in those adjacent time periods.

According to aspects of the present disclosure, techniques for reducing or mitigating the impact of the above described transient transmissions and/or other spurious transmissions are provided.

Figure 9A:
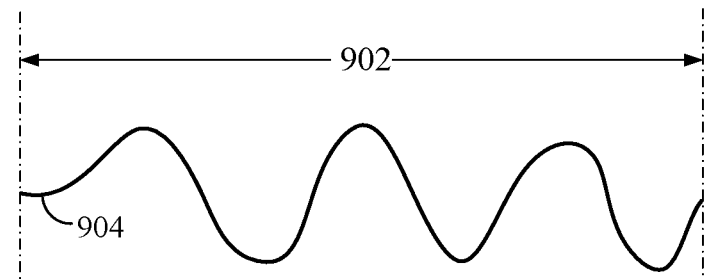
FIGS. 9A-9C illustrate exemplary transmission timelines, according to aspects of the present disclosure.
Figure 9B:
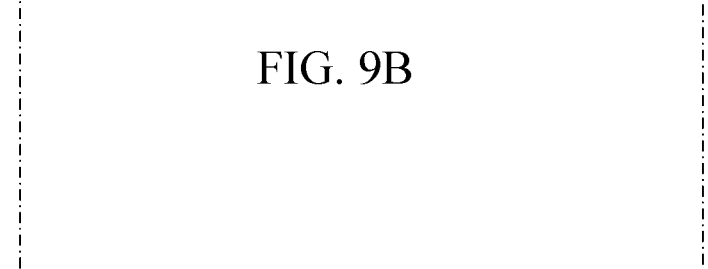
Figure 9C:

FIGS. 9A-9C illustrate exemplary transmission timelines 900, 920, and 950, according to aspects of the present disclosure. In the exemplary timeline 900, an exemplary ideal waveform 904 is transmitted in a transmission time interval (TTI) 902 by an idealized transmitter. It may be noted that the idealized transmitter does not transmit outside of the TTI 902 in the exemplary timeline 900.

In the exemplary timeline 920 shown in FIG. 9B, an exemplary waveform 924 is transmitted by an exemplary transmitter (e.g., a transmitter in UE 120, shown in FIGS. 1 and 4) in the TTI 902. The exemplary transmitter makes a spurious transmission 922 before the TTI 902, for example, when various components of the transmitter are ramping up to a desired power level. It may be noted that the waveform 924 is similar to the waveform 904, shown in FIG. 9A, but the transmitter transmits the spurious transmission 922 outside of the TTI.

In the exemplary timeline 950 shown in FIG. 9C, an exemplary waveform 954 is transmitted by an exemplary transmitter (e.g., a transmitter in UE 120, shown in FIGS. 1 and 4) in the TTI 902. The exemplary transmitter makes a spurious transmission 952 during the TTI 902, for example, when various components of the transmitter are ramping up to a desired power level. It may be noted that the waveform 954 differs from the waveform 904, shown in FIG. 9A, due to the spurious transmission 952, but the transmitter does not transmit outside of the TTI.

Figure 10:
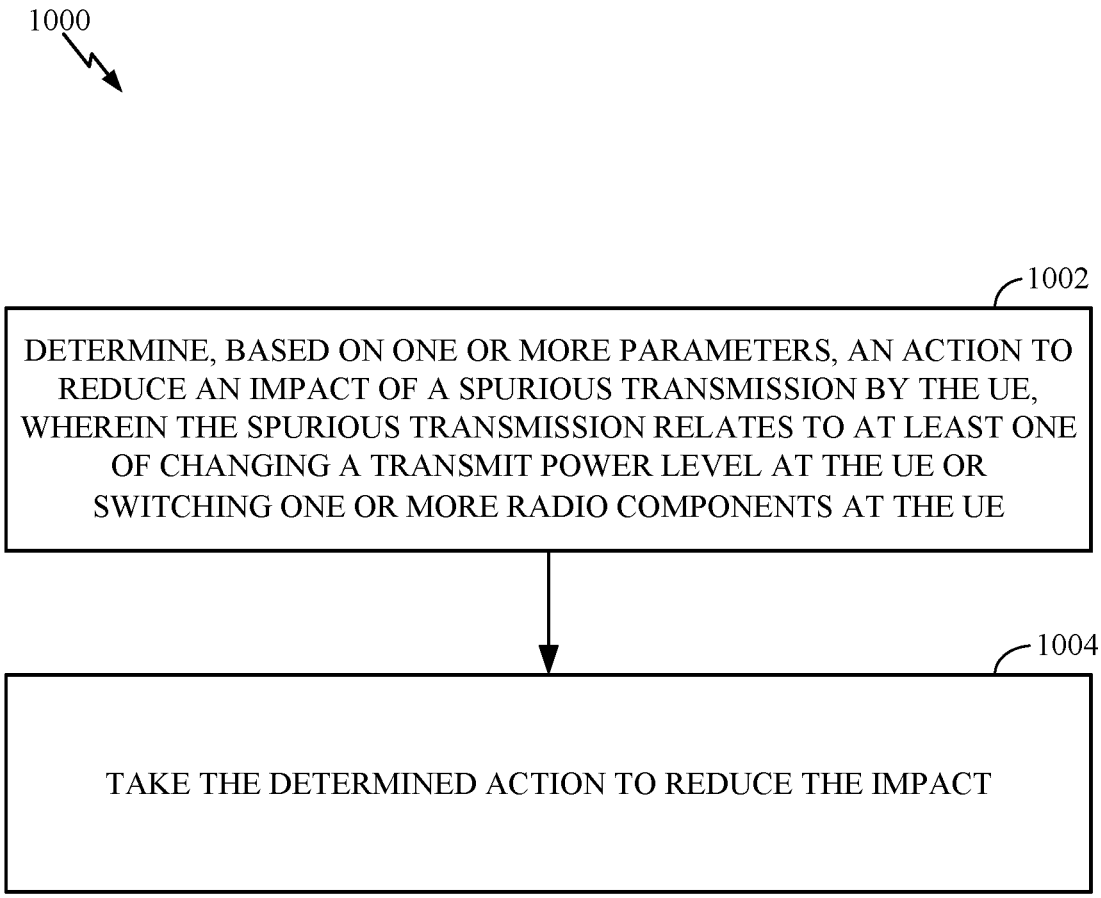
FIG. 10 illustrates example operations that may be performed by a UE, according to aspects of the present disclosure.

FIG. 10 illustrates example operations 1000 for wireless communications that may be performed by a UE, according to aspects of the present disclosure. The UE may be UE 120a, shown in FIG. 1, which may include one or more components illustrated in FIG. 4.

Operations 1000 begin at block 1002 with the UE determining, based on one or more parameters, an action to reduce an impact of a spurious transmission by the UE, wherein the spurious transmission relates to at least one of changing a transmit power level at the UE or switching one or more radio components at the UE. For example, UE 120a determines to power up transmitter components of the UE in a period before making a scheduled transmission to reduce the impact of a spurious transmission, related to powering up the transmitter components, on the scheduled transmission by the UE. In the example, the UE determines to cause the spurious transmission to occur outside of a period for the scheduled transmission, similar to the timeline 920, shown in FIG. 9B.

At block 1004, operations 1000 continue with the UE taking the determined action to reduce the impact. Continuing the example from above, the UE powers up transmitter components before the beginning of the period for the scheduled transmission.

FIG. 11 illustrates example operations 1100 for wireless communications that may be performed by a BS, according to aspects of the present disclosure. The BS may be BS 110a shown in FIG. 1, which may include one or more components illustrated in FIG. 4.

Operations 1100 begin at block 1102 with the BS providing an indication of one or more parameters related to reducing an impact of a spurious transmission by a user equipment (UE) to the UE, wherein the spurious transmission relates to at least one of changing a transmit power level at the UE or switching one or more radio components at the UE. For example, BS 110a may provide an indication of a priority of a scheduled transmission by UE 120a to the UE, wherein the spurious transmission relates to at least one of a changing a transmit power level at the UE or switching one or more radio components at the UE. In the example, the UE may use the priority to determine when to power up transmitter components of the UE to reduce the impact of a spurious transmission from the UE related to powering up the transmitter components.

According to aspects of the present disclosure, a device (e.g., a UE) may take actions to reduce or mitigate impact of a spurious transmission by the device based on a priority, relative to another signal or signals (e.g., transmissions from other devices), of a scheduled (e.g., desired) transmission related to (e.g., causing) the spurious transmission by the device. The period (e.g., a transmission time interval (TTI)) that is interfered with by the spurious transmission may be used for different types of transmissions. For example, on some occasions the period may be used for a data channel, on other occasions the period may be used for a control channel, a DMRS, or a pilot, or occasionally the period may not be used for any other signals.

In aspects of the present disclosure, relative priority between the scheduled transmission (related to the spurious transmission) and the other signal(s) may vary. The relative "priority" referred to indicates an importance to system operation that the scheduled transmission occur as accurately as possible (e.g., how close to desired waveform, how low is an associated EVM) and free from interference as compared to an importance to system operation that the other signal(s) occur as accurately as possible and free from interference. For example, an OFDM symbol conveying a DMRS or a pilot transmission may have a higher priority than an OFDM symbol conveying a data transmission, especially if there is a single DMRS (e.g., in the OFDM symbol) that serves as a pilot for several data OFDM symbols.

According to aspects of the present disclosure, other pilots, such as sounding pilots (e.g., SRS, CSI-RS, and MRS) may also have higher a priority than data signals.

In aspects of the present disclosure, a device (e.g., a UE) may dynamically select an action to take to reduce an impact of the spurious (e.g., transient) transmission, depending on this relative priority:

According to aspects of the present disclosure, if a spurious transmission will interfere with higher priority transmissions, then the device may take steps to cause the spurious transmission to be within a period of the transmission by the device, so as not to interfere with the higher priority transmissions.

In aspects of the present disclosure, if a spurious transmission will interfere with lower priority signals, then the device may take steps to cause the spurious transmission to be within a period outside of a period of transmission by the device. Taking these steps may improve a quality of the transmission by the device, at the expense of worsening interference to the lower priority signals.

According to aspects of the present disclosure, information on priority for spurious transmissions may be signaled by, for example, a base station (BS).

In aspects of the present disclosure, a BS may provide to a UE priority information for transmissions immediately before and after a transmission scheduled for the UE (e.g., a transmission by the UE). For example, a BS may signal to a UE priority information for transmissions immediately before and after a transmission by the UE as part of an uplink assignment (e.g., in a PDCCH) that causes the UE to send the transmission.

According to aspects of the present disclosure, a BS may provide priority information for transmissions immediately before and after a transmission by a UE explicitly in an assignment grant. As used herein, an "assignment grant" may refer to a grant conveyed in a downlink control information (DCI), a medium access control control element (MAC-CE), a master information block (MIB) a system information block (SIB), or via radio resource control (RRC) signaling.

In aspects of the present disclosure, a BS may provide to a UE priority information for signals immediately before and after a transmission by the UE implicitly by sending a control signal carrying an assignment grant in a time and/or frequency location that indicates the priority information to the UE. For example, a BS may provide priority information for a transmission by sending a control signal carrying an assignment grant at a time such that the slot or subframe index in which the control signal is located indicates the priority information.

According to aspects of the present disclosure, a BS may provide priority information for signals immediately before and after a transmission by a UE implicitly by scheduling the transmission by the UE adjacent to a time of a known signal (e.g., with a known priority. For example, every 4th slot index may be known to a BS to carry a known type of transmission (e.g., SRS) at a certain time location within the slot, and the BS may provide this information to a UE via RRC configuration and/or signaling. In the example, the BS implicitly indicates the priority of a scheduled transmission by the UE by scheduling the transmission adjacent to a period of the known transmission.

In aspects of the present disclosure, priority information may be signaled (e.g., by a BS) in different formats. For example, priority information may indicate the nature (e.g., type) of a signal (e.g., SRS, DMRS, or data) in an adjacent period.

According to aspects of the present disclosure, relative priorities between types of signals may be indicated (e.g., signaled by a BS) in advance of a scheduled transmission in a configuration (e.g., in an RRC configuration, in a MIB and/or SIBs, or via a table in a wireless communications specification).

In aspects of the present disclosure, priority information may be signaled (e.g., by a BS), in an index directly conveying the priority level. For example, a BS may transmit a DCI indicating a scheduled transmission is higher priority than signals immediately before the scheduled transmission.

According to aspects of the present disclosure, an index of a priority level may indicate more than two (e.g., high and low) priorities. A difference between the indices of a scheduled transmission by a UE and a signal in an adjacent period may indicate to what extent the UE may let a spurious transmission associated with the scheduled transmission overlap with the signal in the adjacent period.

In aspects of the present disclosure, actions taken to reduce impact of spurious transmissions may be affected by a plurality of factors in addition to priority levels.

According to aspects of the present disclosure, actions taken to reduce impact of spurious transmissions may depend on ordering of signals. That is, which signal has higher priority may depend on which signal is transmitted earlier. The strength of the spurious or transient transmission may be different at the beginning of the transmission as compared to at the end of the transmission, and the priority determination may take this into account.

In aspects of the present disclosure, actions taken to reduce impact of spurious transmissions may depend on instantaneous signal powers of a scheduled transmission and other signals (e.g., signals in periods adjacent to a period of the scheduled transmission). For example, in some situations a lower priority signal may be required to not overlap with a higher priority signal for certain combinations of power levels of the two signals, but the signals may be allowed to overlap for certain other power level combinations.

According to aspects of the present disclosure, power-level thresholds for determining actions to take to reduce impact of spurious transmissions may be configured.

In aspects of the present disclosure, a scheduled transmission (e.g., with a related spurious transmission) and the other signal (e.g., that may be interfered with by the spurious transmission) may not be transmissions between different transmitters and/or receivers or via different transmission links. For example, two transmissions in adjacent periods from the same transmitter to the same receiver, but of different types and power levels (e.g., SRS followed by DMRS) may also cause spurious transmissions, and actions may be taken to reduce an impact of the spurious transmissions.

According to aspects of the present disclosure, priority level and actions taken to reduce impact of spurious transmissions may be different, depending on whether or not the contending signals have a same transmitter and/or receiver, or a conveyed via different transmission links.

It may be noted that in the case of transmissions via a same transmission link, there is no additional overhead consumed to signal the nature of the signal with which the spurious transmission may interfere, as both transmissions comes from the same device, which can determine the nature of the signals.

In aspects of the present disclosure, a switching gap or guard period may be treated as a special case of priority indication.

According to aspects of the present disclosure, NR supports mini-slot transmission, where a mini-slot comprises N OFDM symbols, and N is less than the defined number of OFDM symbols in a slot (e.g., seven). A mini-slot may span across slot boundaries.

In aspects of the present disclosure, mini-slots occurring immediately before or immediately after a DL to UL switch may have an associated guard time for the switching. Spurious transmissions may be moved into the guard time without impacting other signals. However, if a UE only knows a start and end time of a mini-slot that has been allocated to the UE for a transmission, the UE may not know whether or not that mini-slot is preceded and/or followed by a guard period.

According to aspects of the present disclosure, additional signaling may be used to inform a UE about presence or absence of guard periods immediately before and/or after a mini-slot in which the UE has been scheduled to transmit.

In aspects of the present disclosure, a guard period may be treated as a type of transmission having the least possible priority and lower than a priority of any other actual signal of interest. For example, a UE may be configured with to treat all guard periods with a priority of −1, while a BS serving the UE may indicate priorities of transmissions and signals as either 0 or 1, so that the UE will treat all transmissions as having a higher priority that a guard period.

According to aspects of the present disclosure, beamforming may be used to reduce an impact of a spurious transmission.

In aspects of the present disclosure, in systems using beamforming, for example, millimeter wave systems, when a spurious transmission related to a scheduled transmission may interfere with signals in time-slots adjacent to a time-slot of the scheduled transmission, beams may be used to transmit the spurious transmission that are different from beams used to transmit the actual signal of interest. The signal of interest may be beamformed so as to reach its intended receiver as strongly as possible. The beam used to transmit the signal of interest may be selected, optimized, and updated, based on beam training and/or beam management procedures.

According to aspects of the present disclosure, the spurious transmission may be beamformed so as to cause minimal interference to all receivers of the signals in the adjacent time durations which the spurious transmission will overlap. Undesired beams (e.g., beams that are weakly received by the intended receiver and are weaker interferers than other beams) identified during beam training and/or management may be used for the spurious transmission. These undesired beams may also be updated by beam management. If the undesired beams start becoming stronger interferers, then a new undesired beam may be found (e.g., by reference to previous beam training or performing a new beam training operation) and used for spurious transmissions. The UE may autonomously find new undesired beams, or the base station may signal new undesired beams to the UE. The base station may coordinate with neighboring base stations to determine the undesired beams, so as to ensure that the undesired beams used for spurious transmissions are received weakly at all the receivers in the neighboring cells as well. In particular, with dynamic TDD operation, the neighboring cells could be sending downlink traffic, and the receivers being interfered with in those cells would then be UEs, rather than base stations. This may make it more difficult to determine an appropriate undesired beam. So the base station may coordinate with the neighboring base stations to schedule transmissions to reduce the frequency of such occurrences, for example, when the spurious transmissions are known to be particularly strong, or for UEs (e.g., both UEs transmitting spurious transmissions and UEs being interfered with) near the cell edge.

In aspects of the present disclosure, both the technique of shifting a spurious transmission in time based on relative priority of a related scheduled transmission and the technique of using beamforming to reduce an impact of a spurious transmission may be combined.

According to aspects of the present disclosure, the technique of shifting a spurious transmission in time based on relative priority of a related scheduled transmission and the technique of using beamforming may also influence each other. For example, a transmission deemed as high priority (e.g., disallowing any interfering spurious transmission) without beamforming may be revised to a lower priority that allows some interfering spurious transmissions, if it is known that the impact of those spurious transmissions can be mitigated by beamforming the spurious transmissions to use an undesired (e.g., weakly received by an intended receiver of the high priority transmission) beam.

In aspects of the present disclosure, the technique of shifting a spurious transmission in time based on relative priority of a related scheduled transmission and the technique of using beamforming may also be used with other spurious emissions. For example, an RF calibration procedure (e.g. by a UE calibrating a receiver of the UE) may involve transmitting some known test signals by a device. Test signal transmissions for the RF calibration procedure can be scheduled by the network, and may partially overlap with other signals based on priority levels of the other signals and the test signal transmissions. When overlapping, impact of the test signal transmission can be reduced by beamforming the test signals to use weak transmissions, as described above. Alternatively, the UE may autonomously transmit the test signals with sufficiently low power and a suitable beamforming so that the test signals cause a lower amount of interference. The power levels and beamforming pattern or weights may be determined by the UE or signaled to the UE by the base station, as described above.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product/computer readable medium for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
    determining a first time interval, associated with a first scheduled transmission, to perform at least a first action selected from the group consisting of: changing a transmit power level at the UE, switching one or more radio components at the UE, and transmitting signaling as part of a calibration procedure of the UE;
    transmitting the first scheduled transmission subsequent to performing the selected first action during the first time interval;
    determining a second time interval, associated with a second scheduled transmission and different from the first time interval, to perform at least a second action selected from the group consisting of: changing the transmit power level at the UE, switching one or more radio components at the UE, and transmitting signaling as part of the calibration procedure or another calibration procedure of the UE; and
    transmitting the second scheduled transmission prior to performing the selected second action during the second different time interval.

2. The method of claim 1, wherein the first scheduled transmission is a data transmission scheduled for a first transmission interval and wherein the first time interval is at least partially included in the first transmission interval.

3. The method of claim 1, wherein the first scheduled transmission comprises a sounding reference signal (SRS) transmission scheduled for a first transmission interval and wherein the second time interval begins at or after a second transmission interval, wherein the second scheduled transmission is scheduled for the second transmission interval.

4. The method of claim 1, wherein the first action is changing the transmit power level at the UE.

5. The method of claim 1, wherein determining the first time interval is based on a communication from a base station.

6. The method of claim 1, wherein one of the first scheduled transmission and the second scheduled transmission has a higher priority than the other of the first scheduled transmission and the second scheduled transmission.

7. The method of claim 6, further comprising:
    receiving an indication, from a base station (BS), of the higher priority.

8. The method of claim 7, wherein the indication of the higher priority is received in a grant including an indication of transmission resources for the UE to use for the scheduled transmission corresponding to the higher priority.

9. The method of claim 7, wherein the indication of the higher priority indicates a type of the other scheduled transmission.

10. The method of claim 7, wherein the indication of the higher priority indicates an absolute priority of the other scheduled transmission.

11. The method of claim 1, further comprising:
determining a relative priority of the first scheduled transmission to the second scheduled transmission, based on a schedule and priorities for other signals at other times.

12. The method of claim 11, further comprising:
determining the relative priority based on at least one of a first period of the first scheduled transmission or a second period of the second scheduled transmission.

13. The method of claim 11, further comprising:
determining the relative priority based on at least one of a first power of the first scheduled transmission or a second power of the second scheduled transmission.

14. The method of claim 11, further comprising:
determining the relative priority based on a desired beam to be used for the first scheduled transmission and an undesired beam to be used by a transmitter of the UE while performing the selected first action.

15. The method of claim 1, wherein a guard period occurs immediately before a period for the first scheduled transmission and determining the first time interval comprises determining the first time interval to occur during the guard period.

16. The method of claim 15, further comprising:
obtaining an indication from a base station that the guard period occurs immediately before the period for the first scheduled transmission.

17. The method of claim 1, wherein a guard period occurs immediately after a period for the second scheduled transmission and determining the second time interval comprises determining the second time interval to occur during the guard period.

18. The method of claim 17, further comprising:
obtaining an indication from a base station that the guard period occurs immediately after the period for the second scheduled transmission.

19. An apparatus for wireless communications, comprising:
a processing system configured to:
determine a first time interval, associated with a first scheduled transmission, to perform at least a first action selected from the group consisting of: changing a transmit power level at the apparatus, switching one or more radio components at the apparatus, and transmitting signaling as part of a calibration procedure of the apparatus;
transmit the first scheduled transmission subsequent to performing the selected first action during the first time interval;
determine a second time interval, associated with a second scheduled transmission and different from the first time interval, to perform at least a second action selected from the group consisting of: changing the transmit power level at the apparatus, switching one or more radio components at the apparatus, and transmitting signaling as part of the calibration procedure or another calibration procedure of the apparatus; and
transmit the second scheduled transmission prior to performing the selected second action during the second different time interval; and
a memory connected with the processing system.

20. The apparatus of claim 19, wherein the first scheduled transmission is a data transmission scheduled for a first transmission interval and wherein the first time interval is at least partially included in the first transmission interval.

21. The apparatus of claim 19, wherein the first scheduled transmission comprises a sounding reference signal (SRS) transmission scheduled for a first transmission interval and wherein the second time interval begins at or after the second transmission interval.

22. The apparatus of claim 19, wherein the first action is changing the transmit power level at the apparatus.

23. The apparatus of claim 19, wherein the processing system is configured to determine the first time interval based on a communication from a base station.

24. The apparatus of claim 19, wherein one of the first scheduled transmission and the second scheduled transmission has a higher priority than the other of the first scheduled transmission and the second scheduled transmission.

25. The apparatus of claim 24, wherein the processing system is further configured to:
receive an indication, from a base station (BS), of the higher priority.

26. The apparatus of claim 19, wherein the processing system is further configured to:
determine a relative priority of the first scheduled transmission to the second scheduled transmission, based on a schedule and priorities for other signals at other times.

27. The apparatus of claim 26, wherein the processing system is further configured to:
determine the relative priority based on at least one of a first period of the first scheduled transmission or a second period of the second scheduled transmission.

28. The apparatus of claim 26, wherein the processing system is further configured to:
determine the relative priority based on at least one of a first power of the first scheduled transmission or a second power of the second scheduled transmission.

29. The apparatus of claim 19, wherein a guard period occurs immediately before a period for the first scheduled transmission and the processing system is configured to determine the first time interval by determining the first time interval to occur during the guard period.

30. The apparatus of claim 19, wherein a guard period occurs immediately after a period for the second scheduled transmission and the processing system is configured to determine the second time interval by determining the second time interval to occur during the guard period.

* * * * *